US006320856B1

United States Patent
Deschaine et al.

(10) Patent No.: US 6,320,856 B1
(45) Date of Patent: *Nov. 20, 2001

(54) SYSTEM AND METHOD FOR A MULTI-HOST SUBSCRIBER LOOP

(75) Inventors: Stephen A. Deschaine, Garland; Richard L. Howe, Plano; Edward P. Traupman, Fairview; Stephen R. Mallinson, Dallas, all of TX (US)

(73) Assignee: Alcatel USA, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/264,595

(22) Filed: Mar. 8, 1999

Related U.S. Application Data

(63) Continuation of application No. 08/652,157, filed on May 23, 1996, now Pat. No. 5,881,059.

(51) Int. Cl.$^7$ .................................................. H04B 7/212
(52) U.S. Cl. ..................... 370/337; 370/338; 370/347; 370/421; 370/432; 370/473; 370/522; 379/220; 455/452
(58) Field of Search ..................................... 370/327–330, 370/336–338, 340–345, 347, 348, 350, 400, 410, 420, 421, 432, 485–487, 496, 498, 503, 507, 510, 512, 514, 522, 524, 528; 379/219, 220; 455/524, 422, 426, 450, 517, 451, 452, 500, 501, 502, 507, 509, 510–513

(56) References Cited

U.S. PATENT DOCUMENTS

| 4,748,621 | 5/1988 | Ballance et al. ..................... 370/335 |
| 5,206,901 | 4/1993 | Harlow et al. ....................... 379/211 |
| 5,315,641 | * 5/1994 | Montgomery et al. .............. 379/220 |
| 5,434,854 | 7/1995 | Focarile et al. ...................... 370/335 |
| 5,455,824 | 10/1995 | Okuyama et al. .................... 370/359 |

(List continued on next page.)

FOREIGN PATENT DOCUMENTS

| 4343456 | 8/1994 | (DE) | ............................. H04L/12/00 |
| 0437350 | 7/1991 | (EP) | ............................. H04Q/11/04 |
| 2273421 | 6/1994 | (GB) | ............................. H04Q/3/60 |

OTHER PUBLICATIONS

Hamilton, et al., "Remote Rural Modernization in the UK", British Telecommunications Engineering, vol. 9, Aug. 1990, pp. 112–118.

Lisle, et al., "Exploiting the Copper Network", British Telecommunications Engineering, vol. 10, Part 1, Apr. 1991, pp. 26–33.

Dewachtere, et al., "Complementary solutions for telecommunications in low density areas", Electrical Communication, Jan. 1, 1995, pp. 6–13.

Youman, Robert S., "The Evolving Role of Remote Digital Switching Solutions", Proceedings of the National Communications Forum, vol. 44, Oct. 8, 1990, pp. 450–453.

Badoual, et al., "Système rural de raccordement d'abonnés par voie hertzienne", L'Onde Electrique, vol. 53, No. 8–9, Aug. 1983, p. 23–29.

PCT Search Report, dated Mar. 20, 1997.

*Primary Examiner*—Seema S. Rao
(74) *Attorney, Agent, or Firm*—Baker Botts L.L.P.

(57) ABSTRACT

A multi-host subscriber loop (10, 70) includes N central office terminals (22–26, 78) coupled to a local exchange (20, 76), where one of the N central office terminals (22, 110) is directly coupled to all other central office terminals (24–26, 112–114). M remote terminals (40–46, 100–104) are coupled to a plurality of telephone service subscribers. A single network facility (16, 76) is coupled between the M remote terminals and N central office terminals. The single network facility concentrates subscriber traffic, control information and associated signaling onto one message structure (60, 140). Messages in this message structure are transmitted between the remote terminals and central office terminals. The message structure includes a plurality of time slots, a first predetermined number of the time slots being allocated to N control channels, at least one time slot being allocated to associated signaling, and remaining time slots being allocated to subscriber traffic.

41 Claims, 4 Drawing Sheets

U.S. PATENT DOCUMENTS

| | | | |
|---|---|---|---|
| 5,519,697 | 5/1996 | Fujita et al. | 370/338 |
| 5,550,898 | 8/1996 | Abbasi et al. | 370/336 |
| 5,559,804 | 9/1996 | Amada et al. | 370/347 |
| 5,563,883 | 10/1996 | Cheng | 370/449 |
| 5,608,780 | 3/1997 | Gerszberg et al. | 370/338 |
| 5,610,910 | 3/1997 | Focsaneanu et al. | 370/351 |
| 5,617,422 | 4/1997 | Litzenberger et al. | 370/401 |
| 5,661,723 | 8/1997 | Ueno et al. | 370/315 |
| 5,677,909 | 10/1997 | Heide | 370/347 |
| 5,784,377 * | 7/1998 | Baydar et al. | 370/463 |
| 5,889,773 * | 3/1999 | Stevenson, III | 370/352 |

* cited by examiner

SYSTEM AND METHOD FOR A MULTI-HOST SUBSCRIBER LOOP

RELATED PATENT APPLICATION

This application is a continuation of U.S. application Ser. No. 08/652,157 filed May 23, 1996, now U.S. Pat. No. 5,881,059.

TECHNICAL FIELD OF THE INVENTION

This invention is related in general to the field of telecommunications systems. More particularly, the invention is related to a system and method for a multi-host subscriber loop.

BACKGROUND OF THE INVENTION

Telecommunications networks have traditionally provided subscriber services by connecting them to the nearest telephone office with copper wires. Each subscriber was allocated the number of wires necessary for the type of service. The assignment of wires was dedicated to each subscriber. For example, a plain old telephone service (POTS) subscriber typically required one pair of copper wires for each telephone number.

As technology advanced, it was possible to digitally multiplex and concentrate more subscribers on a less number of copper wires. A typical example is the Digital Loop Carrier (DLC) as described in a Bellcore document TR-TSY-0008. In DLC, the telecommunications network provide service to subscribers through the support of remote subscriber terminals connected to central office terminals. The DLC technology allows a single remote terminal to be connected to a single central terminal. These remote subscriber terminals connect directly to the subscribers premise providing such services as POTS, coin, ISDN, and Wideband. The central office terminals provide connections to the local exchange switch and thus the rest of the telecommunications network. In DLC, a fixed traffic concentration not exceeding 2:1 was possible between the single central office terminal and single remote terminal.

Further technical advances have allowed multiple remote terminals to be connected to a single central terminal as in Optical Line Terminal to Optical Network Unit (OLT-ONU) configurations where a single OLT supports multiple ONUs). This is typically configured in a cascaded or dual cascaded configuration emanating from the central office terminal. For both the DLC and OLT-ONU configurations, a standard line interface is used to connect the remote terminals to their central office terminal. The control of the central office terminal and the remote terminal(s) connection is also not transparent to the network facility connecting them. Further, these configurations are disadvantageously limited to the size of the terminals and the capacity of the line connecting the terminals.

SUMMARY OF THE INVENTION

Accordingly, there is a need for multiple central office terminals to be able to be connected to multiple remote terminals to increase utilization across the network facility for concentrated traffic, whether the network facility be a copper, optical, or wireless connection.

In accordance with the present invention, a multi-host subscriber loop is provided which eliminates or substantially reduces the disadvantages associated with prior subscriber loop configurations.

In one aspect of the invention, the multi-host subscriber loop includes N central office terminals coupled to a local exchange, where one of the N central office terminals is directly coupled to all other central office terminals. M remote terminals are coupled to a plurality of telephone service subscribers. A single network facility is coupled between the M remote terminals and N central office terminals. The subscriber traffic, control information and associated signaling are concentrated onto the single network facility.

In another aspect of the invention, messages are transmitted between the remote terminals and central office terminals through the network facility. The message structure includes a plurality of time slots, where each remote terminal is assigned a predetermined number of time slots.

In yet another aspect of the invention, the time slots assigned to each remote terminal include one time slot for control, and remaining time slots being allocated to subscriber traffic.

In yet another aspect of the invention, the time slots assigned to each remote terminal include one time slot for control, one time slot for signaling, and remaining time slots being allocated to subscriber traffic.

In yet another aspect of the invention, the time slots assigned to each remote terminal are dynamically assigned to the subscribers on a per call basis depending on subscriber line conditions.

In yet another aspect of the invention, subscriber traffic bandwidth is not limited to a single time slot per subscriber. Subscriber traffic may use as many time slots as are available or necessary to accommodate the offered service, including wideband traffic.

A technical advantage of the present invention is the enhanced utilization of the network facility by concentrating subscriber traffic. Further, the control of multiple central office terminals connected to the remote terminals is advantageously transparent to the underlying network facility. The assignment of time slots to a particular subscriber may also be done dynamically on a per call basis depending on subscriber line condition. A further technical advantage is the enhancement of supported subscriber services to include wideband terminations and dynamic assignment of multiple time slots to support enhanced subscriber services.

BRIEF DESCRIPTION OF THE DRAWINGS

For a better understanding of the present invention, reference may be made to the accompanying drawings, in which.

DETAILED DESCRIPTION OF THE INVENTION

Figure 1:
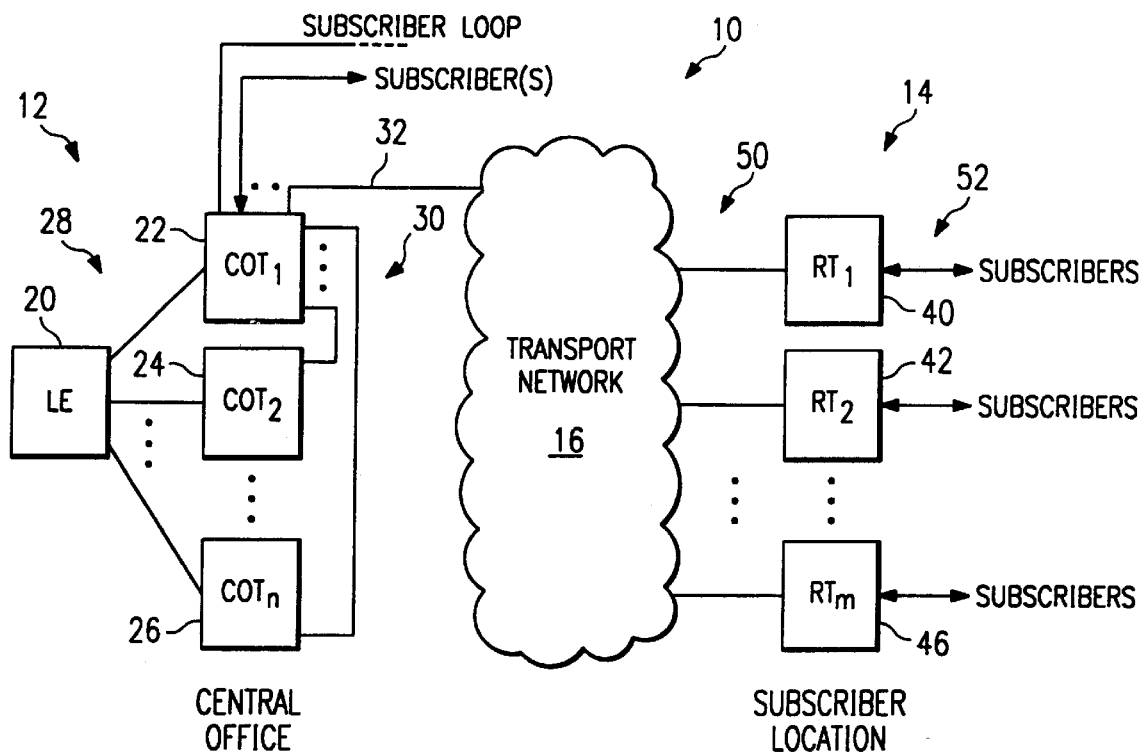
FIG. 1 is a simplified block diagram of a system for a multi-host subscriber loop constructed in according to the teachings of the present invention.

The preferred embodiment(s) of the present invention is (are) illustrated in FIGS. 1–5, like reference numerals being used to refer to like and corresponding parts of the various drawings.

Referring to FIG. 1, a multi-host subscriber loop system is shown, indicated generally at 10. Multi-host subscriber loop system 10 includes a central office 12 and a subscriber location 14 linked via a transport network 16. Central office 12 includes a local exchange 20 connected to a plurality of central office terminals $COT_{1-n}$ 22–26 via a plurality of lines 28. In domestic telephony applications, lines 28 may be 1.5 Mb lines. In international telephony applications, lines 28 may be 2 Mb lines as specified by the *General aspects of Digital Transmission Systems; Terminal Equipments* set forth by the International Telecommunication Union CCITT G.703 *Physical/Electrical Characteristics of Hierarchical Digital Interfaces* and G.704 *Synchronous Frame Structures Used at Primary and Secondary Hierarchical Levels*.

The central office terminals $COT_{1-n}$ 22–26 are also interconnected, where $COT_1$ 22 is directly coupled to each of the other central office terminals $COT_{2-n}$ 24 and 26 via lines or an internal bus 30. Lines 30 may be 2 Mb lines carrying control, signaling and subscriber traffic in a proprietary format. Central office terminals 22–26 may also be coupled directly to subscriber(s) to terminate subscriber lines. Central office terminals $COT_{1-n}$ 22–26 may be implemented by the Litespan-120™ manufactured by DSC Communications Corporation. Litespan-120™ is a small digital loop carrier system that provides either switch or subscriber interfaces for supporting subscriber POTS (RPOTS), VF switch interfaces (CPOTS), and 2 Mb interfaces (E1). $COT_1$ 22 is further coupled to transport network 16 and subscriber location 14 via a single 2 Mb line network facility 32. For domestic applications, network facility may be a 1.5 Mb line. The protocol of transmission on network facility 32 is described in detail below with references to FIGS. 2A and 2B. Transport network 16 is a communications link between central office location 12 and subscriber location 14 for transmission of voice, data, signaling and control information therebetween, and may be implemented by wireless, optical, or electrical transmission.

Remote terminals $RT_{1-m}$ 40–46 at subscriber location 14 are each preferably coupled to transport network 16 via a 2 Mb line or internal bus 50. Remote terminals $RT_{1-m}$ 40–46 may also be implemented with the Litespan-120™. There need not be a one-to-one correspondence between central office terminals $COT_{1-n}$ 22–26 and remote terminals $RT_{1-m}$ 40–46, and multiple central office terminals may be connected to multiple remote terminals, unlike the SLC-96 and SLC-Series 5 subscriber loop carrier systems of AT&T Bell Laboratories. Each remote terminal $RT_{1-m}$ 40–46 is coupled to a predetermined number of subscribers via a line 52, providing a variety of services ranging from POTS (plain old telephone service), pay phone, ISDN, wideband, etc. Accordingly, subscriber bandwidth traffic is not limited to a single time slot per subscriber.

It is further contemplated and shown in FIG. 1 that $COT_1$ 22 may also be coupled to one or more additional subscriber loops similarly constructed as transport network 16 and subscriber location 14 as described above. Furthermore, it also possible to have a single point-to-point configuration between one of the central office terminals and one of the remote terminals.

Figure 2A:
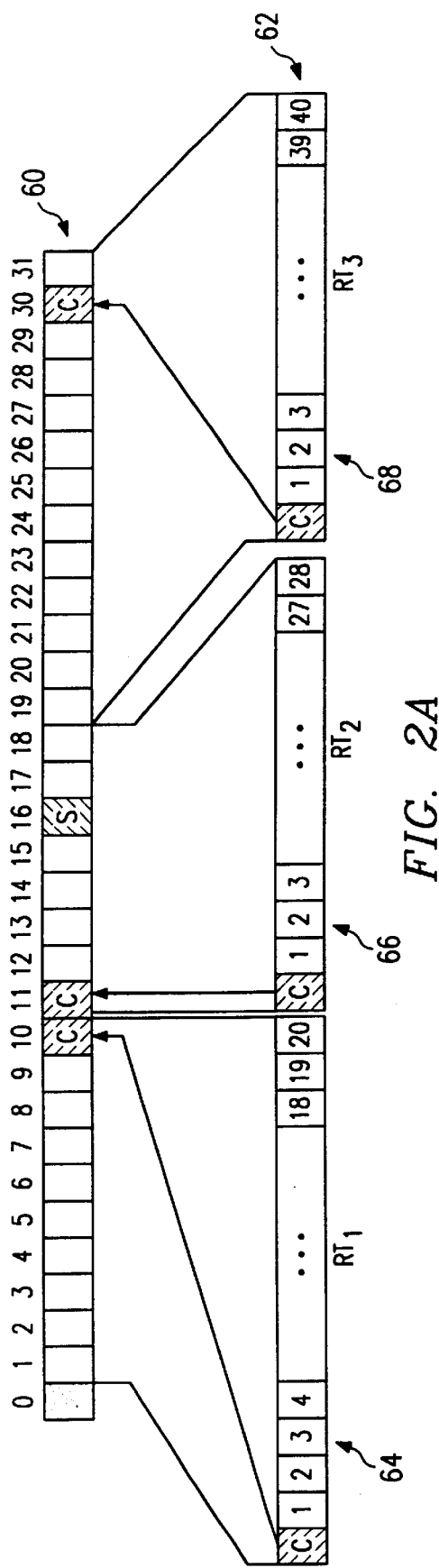
FIGS. 2A and 2B are exemplary mappings of remote terminal subscriber traffic onto one 2 Mb network facility.

Referring to FIG. 2A, a concentrated 2 Mb frame with bearer channel, signaling, and control information mapping between the remote terminals and central office terminals is shown. According to ITU G.703 and 704, a 2 Mb network facility is to be used between the central office terminal and the remote terminal, where time slot 0 is devoted to synchronization information, and time slot 16 is devoted to common channel or channel associated signaling. The rest of the time slots may be used to carry subscriber data or bearer channels. In an embodiment of the present invention, multiple control, signaling, and bearer channels for multiple remote terminals are concentrated and mapped onto a single 2 Mb network facility 60 in a Terminal Payload Envelope (TPE) 64–68. Terminal Payload Envelope 64–68 is a general structure that may be transported across time slot structured telephone facilities. In one embodiment of the present invention as shown in FIG. 2A, the use of time slot 0 remains the same as specified in ITU G.704, and all signaling, such as channel associated signaling, for the bearer channels is carried in time slot 16. However, the remaining time slots are allocated to three remote terminals $RT_{1-3}$, for example. The maximum number of bearer channels that can be carried in the concentrated network facility is based on the grade of service of a specified number of subscribers. For example, for remote terminal $RT_1$, there are twenty subscribers mapped onto nine time slots (TS1–TS9); for $RT_2$, 28 subscribers are mapped onto six time slots (TS12–TS15, TS17–TS18); and for $RT_3$, 40 subscribers are mapped onto twelve time slots (TS19–TS29 and TS31). The time slots assigned to each remote terminal are dynamically allocated to the subscribers on a per call basis depending on subscriber line condition.

Note that the control information for each remote terminal may be mapped onto any time slot within the time slots allocated for the remote terminal. Alternatively, certain time slots may be designated to carry control information for a certain number of remote terminals. For example, time slots 10, 20, and 30 may be designated to carry control information if system 10 includes three remote terminals.

Figure 2B:
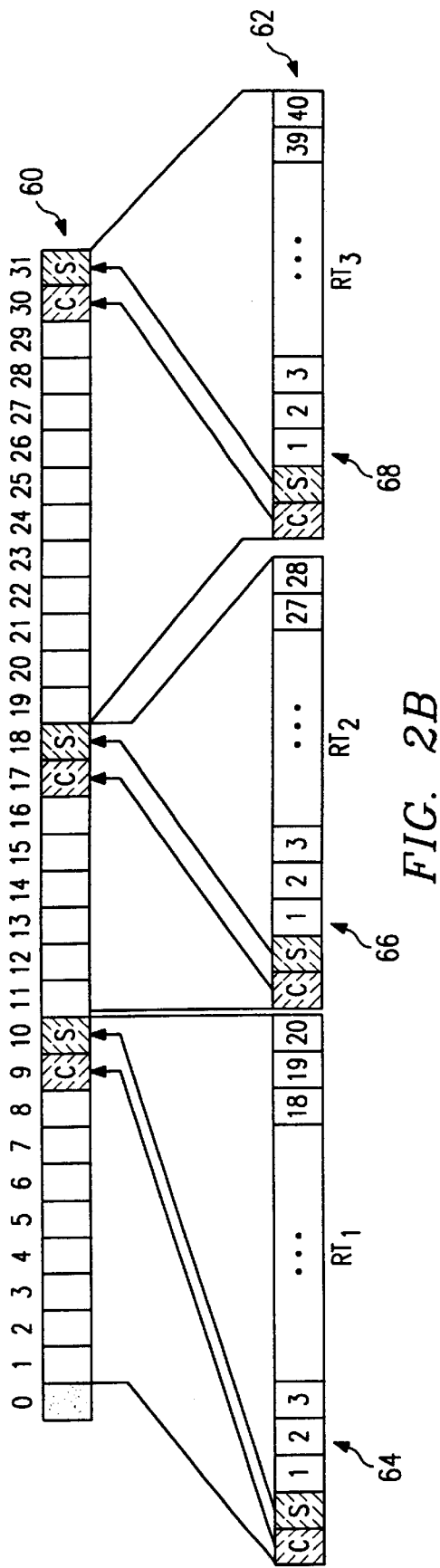

Referring to FIG. 2B, an alternate embodiment of concentration and mapping of remote terminal bearer channel is shown. In this mapping scheme, TS16 is used for bearer channel data, and control and signaling associated with each remote terminal are carried in two time slots allocated to each remote terminal. For example, for $RT_1$, TS1–TS8 are allocated for bearer channels and TS9 and TS10 are allocated for control and signaling, respectively. Similarly for $RT_2$, TS11–TS16 are allocated for bearer channels, and TS17 and TS18 are allocated for control and signaling, respectively. For $RT_3$, TS19–TS29 are allocated for bearer channels, and TS30 and TS31 are allocated for control and signaling, respectively. In this exemplary concentration and mapping scheme, the control and signaling are carried in the last two time slots allocated to each remote terminal. Alternatively, the control and signaling information may be allocated to the first two time slots, or any two time slots therein.

Although not shown, the present multi-host subscriber loop is also applicable to other subscriber loop standards, such as the 1.5 Mb subscriber loop more commonly used in the United States. In the 1.5 Mb format, each frame has twenty-four time slots including one framing bit, the 193rd bit. The twenty-four time slots may be similarly allocated to transmit Terminal Payload Envelope 64–68 as described above. In this concentration and mapping scheme, the framing 193rd bit is not required for COT/RT control or to synchronize the subscriber signal state as the signaling can be carried in its own time slot. This allows the subscriber channel use of the full 64 Kbs per assigned time slot.

Figure 3:
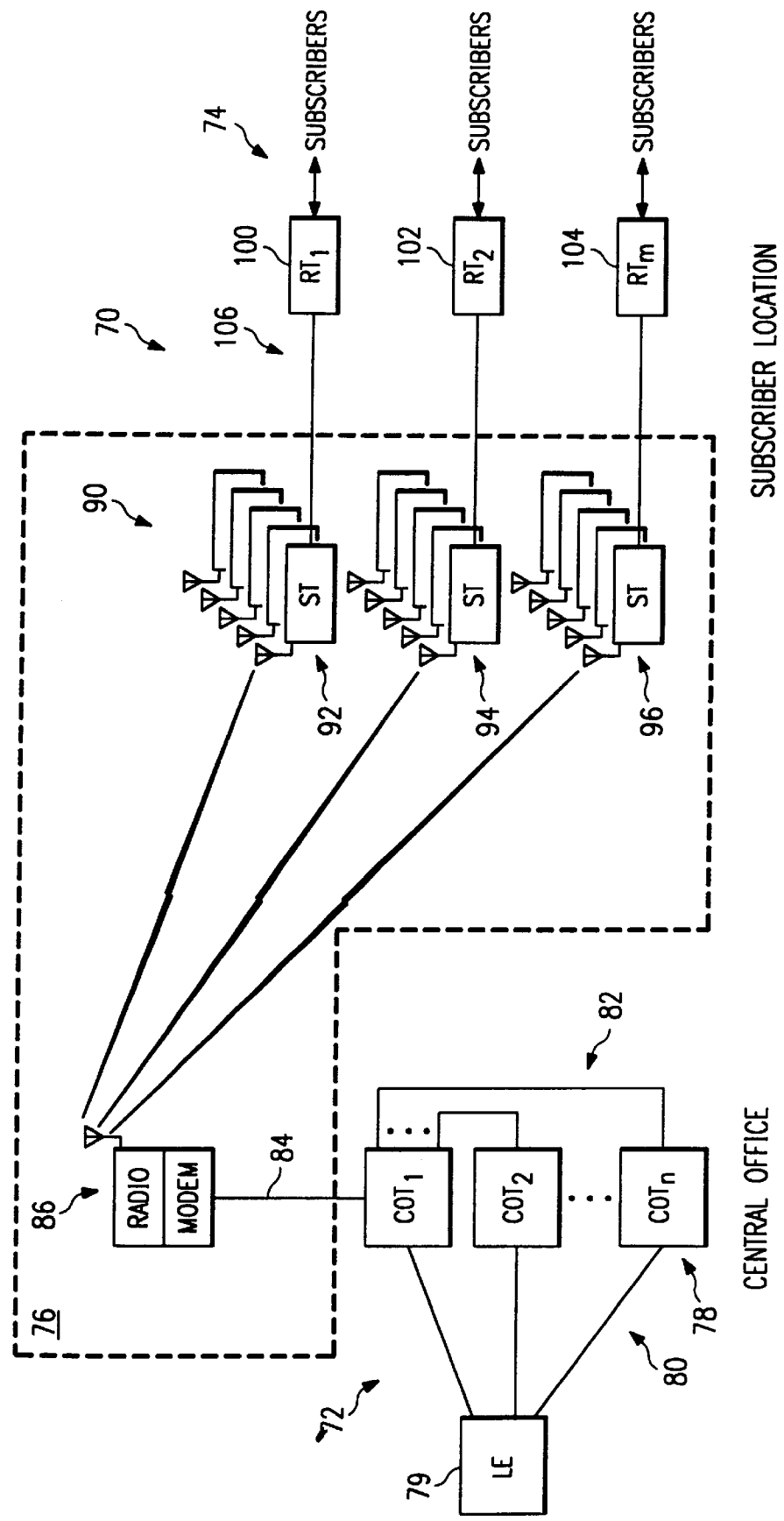
FIG. 3 is a simplified block diagram of an embodiment of a multi-host subscriber loop using a radio transport connection between central office terminals and remote terminals.

Referring to FIG. 3, a multi-host subscriber loop system 70 having a central office location 72 coupled to a subscriber location 74 with a wireless transport network 76 implementation of a transport network 16 in FIG. 1 is shown. At central office location 72, a plurality of central office terminals $COT_{1-n}$ 78 are coupled to a local exchange 79 by lines 80. Central office terminals 78 are connected, where $COT_1$ is directly coupled to all other central office terminals $COT_{2-n}$ via lines 82. $COT_1$ is also linked to network transport 76 via a 2 Mb line having the concentration and mapping set forth in FIGS. 2A and 2B and described above.

An exemplary transport network 76 as shown in FIG. 3 employs a wireless technology for transmitting traffic, control, and signaling information between central office location 72 and subscriber location 74. Transport network 76 includes a modem and RF radio 86 using spread spectrum code division multiple access (SS-CDMA) technology for transmitting data over the air to a plurality of subscriber terminals (ST) 90 at subscriber locations 74. Multiple subscriber terminals 92–96 may be coupled to each remote terminal 100–104, which depends on the concentration level of the subscriber traffic onto the radio link. Subscriber terminals 92–96 are coupled to respective remote terminals 100–104 via 2 Mb proprietary lines 106, with each line carrying Terminal Payload Envelopes 64–68.

Figure 4:
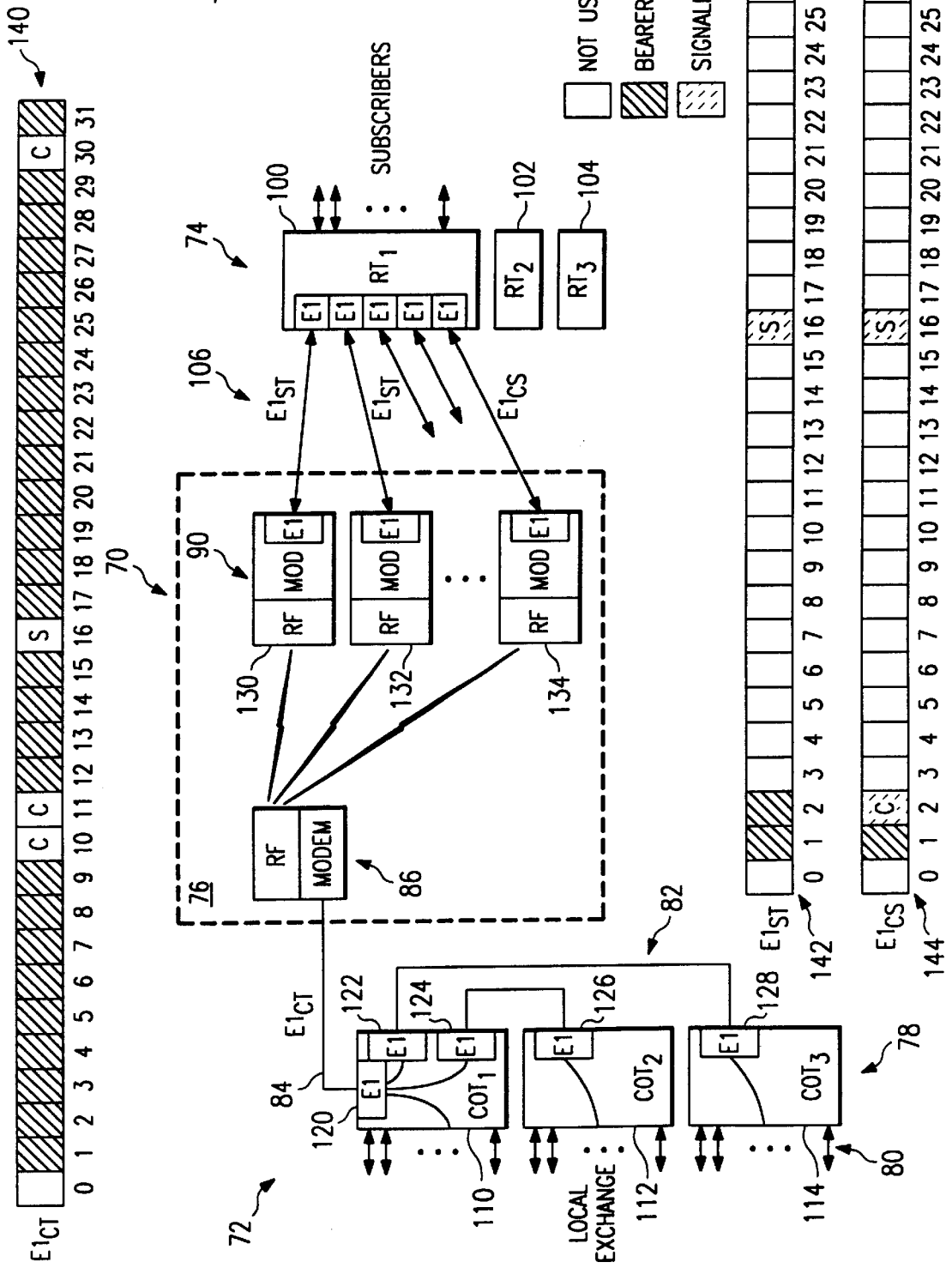
FIG. 4 is an exemplary block diagram and mapping scheme for a multi-host subscriber loop using a radio transport connection between central office terminals and remote terminals.

FIG. 4 shows additional details. In the exemplary configuration shown in FIG. 4, three central office terminals $COT_{1-3}$ 110–114 are coupled to three remote terminals $RT_{1-3}$ 100–104 through a wireless transmission medium 76. Central office terminal $COT_1$ 110 includes three 2 Mb/s interfaces 120–124 to modem and RF radio 86, $COT_2$ 112, and $COT_3$ 114, respectively. Similarly, $COT_2$ 112 and $COT_3$ 114 each includes a 2 Mb/s interface 126 and 128 for interfacing with $COT_1$ 110.

In operation, 2 Mb span 84 connected between radio and modem 86 and $COT_1$ 110 has an exemplary concentrated format shown as $E1_{CT}$ 140 in FIG. 4, and as shown in FIGS. 2A and 2B as Terminal Payload Envelope 64–68. $COT_1$ receives subscriber traffic, control, and signaling information from radio and modem 86, which is in the concentrated format, removes information associated with $RT_1$, and passes on information associated with $RT_2$ to $COT_2$ and information associated with $RT_3$ to $COT_3$. If time slot 16 is used for signaling, $COT_1$ may process the received Terminal Payload Envelope to the extent that it becomes deframed and synchronized to all other subscriber signaling. If time slot 16 is not used for signaling, $COT_1$ does not process $RT_2$ and $RT_3$ bearer, signaling, and control channels in anyway, but merely passes on the information to the destination central office terminal. Upon receipt of the concentrated message, $COT_{1-3}$ then looks for control, signaling channels in the predetermined time slots, and bearer channels in the remaining time slots, and process the information and data accordingly.

At the subscriber side, the exemplary configuration in FIG. 4 shows $E1_{CT}$ is received by subscriber terminals 130–134 and the appropriate Terminal Payload Envelopes are separated and received by the respective remote terminals as one $E1_{CS}$ and multiple $E1_{ST}$. Four subscriber terminals can support two bearer channels and their associated signaling, or bearer information only, an exemplary format of which is shown as $E1_{ST}$ 142. Alternatively, $E1_{ST}$ 142 may carry only bearer channels. Subscriber terminal 134 is designated as the control link carrier for carrying one bearer channel and the associated signaling and a control channel, an exemplary format of which shown as $E1_{CS}$ 144. Alternatively, $E1_{CS}$ may carry only control information or control and signaling only. For both $E1_{ST}$ and $E1_{CS}$ the exemplary format uses TS1 for a subscriber channel and TS2 as either the second bearer channel or the control channel. The associated signaling may be carried in TS16 of $E1_{ST}$ and/or $E1_{CS}$. The remaining time slots are unused. The concentrated messages $E1_{CS}$ and $E1_{ST}$ are used to help set up the call path through the wireless transmission medium in transport network 76. In the exemplary configuration shown, nine bearer channels are carried by five subscriber terminals 90, all of which are coupled to $RT_1$. In the instance where subscriber terminal 134 fails, the $E1_{CS}$ carrying the control channel is routed to another subscriber terminal to minimize the number of out-of-service subscribers on $RT_1$. Accordingly, an $E1_{CT}$ is composed of a plurality of Terminal Payload Envelopes 64–68, with each Terminal Payload Envelope consisting of one $E1_{CS}$ and one or more $E1_{ST}$ at remote terminal 74.

Because the control and signaling channels may occupy any time slot in the 2 Mb signal transmitted between central office terminals and remote terminals, both terminals are provisioned in advance during system initialization as to the location of control and signaling channels, the number of bearer channels, and the allocation of time slots. Dynamic reassignment of control and signaling channels during remote terminal failure conditions as described above are also established. Furthermore, the central office terminals and remote terminals support special commands that allow craft or management provisioning of channel allocations. Databases (not shown) may be created to maintain the provisioning information in non-volatile memory. The database stores details of the multi-host subscriber loop configuration including the number of central office terminals located on a given radio link, the number of bearer channels associated with each central office terminals, and the mapping of the 2 Mb format, etc.

Figure 5:
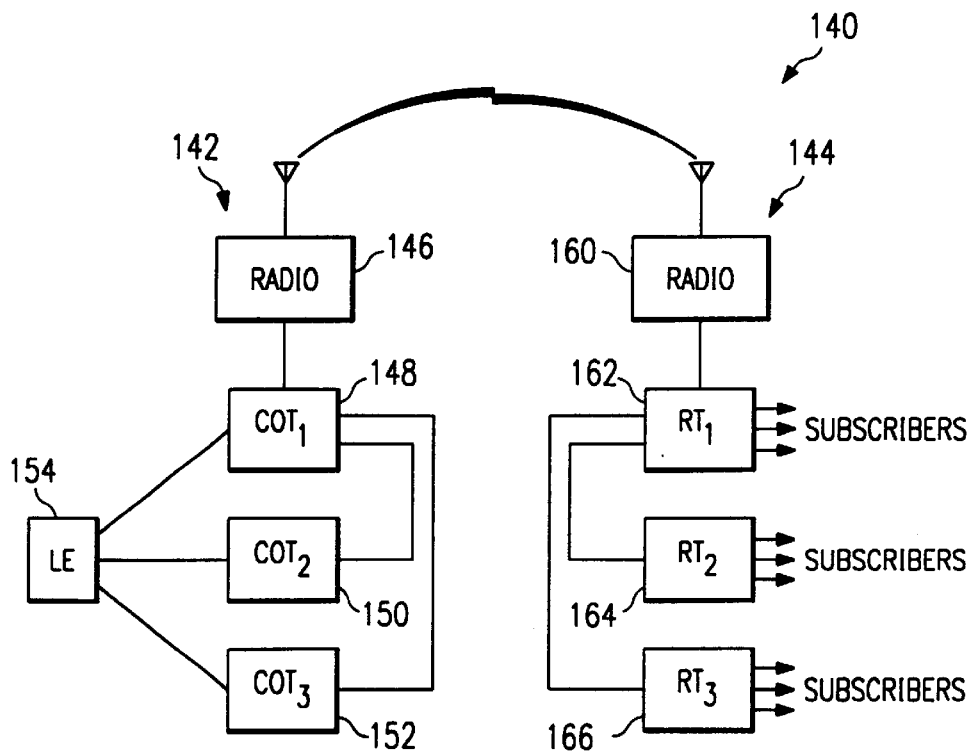
FIG. 5 is a block diagram of an embodiment of a multi-host subscriber loop using a radio transport connection between three central office terminals interconnected as described above and three remote terminals also interconnected in the same manner as the central office terminals.

FIG. 5 shows another connection configuration of a multi-host subscriber loop 140 of the present invention. Subscriber loop 140 includes a central office 142 and a subscriber location 144 linked with a wireless network facility. Central office 142 includes a radio 146 coupled to a first central office terminal $COT_1$ 148, which is directly coupled to central office terminals $COT_2$ 150 and $COT_3$ 152. Each of the central office terminals $COT_{1-3}$ 148–152 is then coupled to a local exchange 154.

Subscriber location 144 also includes a radio 160 in communication with radio 146 of central office 142, and three remote terminals $RT_{1-3}$ 162–166. Remote terminals $RT_{1-3}$ 162–166 are coupled together in a similar manner as central office terminals $COT_{1-3}$: $RT_1$ 162 is coupled directly to each one of the other remote terminals $RT_2$ and $RT_3$ 164 and 166. Accordingly, the $E1_{CT}$ message format shown in FIG. 4 may be used in both the connection between radio 146 and $COT_1$ 148 as well as the connection between radio 160 and $RT_1$ 162. Further, $RT_1$ 162 processes data, control, and signaling associated with its subscribers and passes on information associated with other subscribers to $RT_2$ and $RT_3$, respectively, in a similar manner as central office terminals $COT_{1-3}$ using Terminal Payload Envelopes 64–68 shown in FIGS. 2A and 2B.

It is worthwhile to summarize the distinctive features of the present invention:

1. Multiple central office terminals are coupled to multiple remote terminals via a single network facility.
2. The number of central office terminals need not equal to the number of remote terminals.
3. Transport network 16 may connect the central office terminals to the remote terminals by a wireless, optical, or electrical transmission medium.
4. The remote terminal data, control, and signaling may be mapped to the 2 Mb message format in a number of ways, whether using TS16 for signaling or not; similarly the mapping of subscriber traffic, control, and signaling to the 1.5 Mb message format is also flexible.

5. The control channels for each remote terminal may be mapped to a fixed location within time slots allocated to a remote terminal, or to any predetermined time slot.
6. The time slots assigned to each remote terminal may be dynamically allocated to the subscribers on a per call basis.
7. The control and signaling channels of Terminal Payload Envelopes 64–68 may be reassigned when needed for failure conditions.
8. Subscriber traffic bandwidth may freely extend across a plurality of possible predetermined available time slots without regard for time slot sequence or quantity.
9. Terminal Payload Envelopes 64–68 provide a flexible structure to convey subscriber traffic, signaling, and control between central office terminals and remote terminals without regard of the transport facility format.

The above list is not intended to be exhaustive, but serves to highlight some of the inventive features of the present invention.

Although the present invention and its advantages have been described in detail, it should be understood that various changes, substitutions and alterations can be made therein without departing from the spirit and scope of the invention as defined by the appended claims.

What is claimed is:

1. A subscriber loop, comprising:
   a predetermined number of central office terminals coupled to a local exchange, a particular one of the central office terminals being coupled to each of the other central office terminals; and
   a single network facility coupled to the particular one of the central office terminals to provide communications to and from subscribers, the single network facility supporting concentrated subscriber traffic, control information, and associated signaling onto one message structure and transmitting messages having the message structure to and from the particular one of the central office terminals, the particular one of the central office terminals operable to pass on messages according to their destination to the other central office terminals.

2. The subscriber loop, as set forth in claim 1, wherein the message structure includes a plurality of time slots, a first predetermined number of time slots being allocated to a first predetermined number of control channels, at least one time slot being allocated to associated signaling, and remaining time slots being allocated to subscriber traffic.

3. The subscriber loop, as set forth in claim 2, wherein subscriber traffic occupies one or more time slot per subscriber.

4. The subscriber loop, as set forth in claim 2, wherein time slot allocation to control, signaling, and subscriber traffic is not fixed to any predetermined location.

5. The subscriber loop, as set forth in claim 1, wherein the network facility includes a wireless communications medium.

6. The subscriber loop, as set forth in claim 1, wherein the network facility includes an optical communications medium.

7. The subscriber loop, as set forth in claim 1, wherein the network facility includes a metallic communications medium.

8. The subscriber loop, as set forth in claim 1, wherein one or more of the central office terminals is coupled directly to at least one telephone service subscriber.

9. The subscriber loop, as set forth in claim 1, wherein one of the central office terminals is coupled to at least one other network facility to form at least one other subscriber loop.

10. The subscriber loop, as set forth in claim 1, further comprising:
    at least one additional central office terminal establishing an additional subscriber loop, the additional central office terminal and the particular one of the plurality of central office terminals coupled by an optical ring configuration.

11. A multi-host subscriber loop, comprising:
    a plurality of remote terminals coupled to a plurality of telephone service subscribers, a particular one of the remote terminals being coupled to each of the other remote terminals;
    a single network facility coupled to the particular one of the remote terminals, the single network facility concentrating subscriber traffic, control information and associated signaling onto one message structure and transmitting messages having the message structure to and from the particular one of the remote terminals, the message structure including a plurality of time slots, a first predetermined number of time slots being allocated to a plurality of control channels, at least one time slot being allocated to associated signaling, and remaining time slots being allocated to subscriber traffic, the particular one of the remote terminals operable to pass on messages according to their destination to the other remote terminals.

12. The subscriber loop, as set forth in claim 11, wherein time slot allocation to control, signaling, and subscriber traffic is not fixed to any predetermined location.

13. The subscriber loop, as set forth in claim 11, wherein the network facility includes a wireless communications medium.

14. The subscriber loop, as set forth in claim 11, wherein the network facility includes an optical communications medium.

15. The subscriber loop, as set forth in claim 11, wherein the network facility includes a metallic communications medium.

16. The subscriber loop, as set forth in claim 11, wherein each remote terminal is allocated a number of time slots in the message structure for subscriber traffic, wherein time slots are assigned to subscriber calls dynamically on a per call basis.

17. A method of transmitting subscriber traffic, control, and associated signaling between a plurality of central office terminals at a local exchange and a plurality of remote terminals at a subscriber location, comprising:
    generating a frame structure having a plurality of time slots; and
    allocating a predetermined number of the plurality of time slots to transmit subscriber traffic, control, and signaling of the plurality of remote terminals such that each remote terminal has a plurality of time slots allocated thereto;
    partitioning the frame structure into a desired number of portions corresponding to a same desired number of remote terminals, each portion of the frame structure serving a particular one of the desired number of remote terminals, each portion of the frame structure having a first number of time slots for carrying subscriber traffic of a second number of subscribers supported by a particular remote terminal, the first number of time slots being less than the second number of subscribers.

18. The message structure, as set forth in claim 17, wherein the frame structure includes thirty-two time slots being transmitted at 2 Mb with thirty-one available for use, and at least thirty of the thirty-one time slots being allocated to transmit subscriber traffic, control, and signaling of the plurality of remote terminals.

19. The message structure, as set forth in claim 18, wherein a time slot 0 is unused for control or signaling.

20. The message structure, as set forth in claim 18, wherein a time slot 16 is used for signaling for all subscriber traffic.

21. The message structure, as set forth in claim 18, wherein a time slot 16 is not required for signaling for subscriber traffic.

22. The message structure, as set forth in claim 17, wherein the frame structure includes twenty-four time slots and one framing bit being transmitted at 1.5 Mb, the twenty-four time slots being allocated to transmit subscriber traffic, control, and signaling of the plurality of remote terminals.

23. The message structure, as set forth in claim 22, wherein the framing bit is not used for control or subscriber signal state synchronization.

24. The message structure, as set forth in claim 22, wherein a time slot 16 is used for signaling for all subscriber traffic.

25. The message structure, as set forth in claim 22, wherein a time slot 16 is not required for signaling for subscriber traffic.

26. The message structure, as set forth in claim 22, wherein a time slot 0 is unused for control or signaling.

27. The message structure, as set forth in claim 17, wherein X available subscriber traffic time slots are being concentrated onto Y network facility time slots allocated to each remote terminal at a X:Y ratio, where X is greater than Y.

28. The message structure, as set forth in claim 17, wherein time slot allocation to control, signaling, and subscriber traffic is not fixed to any predetermined location.

29. The message structure, as set forth in claim 17, wherein a control channel for each remote terminal is carried in a first time slot of time slots allocated to each remote terminal.

30. The message structure, as set forth in claim 17, wherein a control channel for each remote terminal is carried in a time slot at a predetermined position within time slots allocated to each remote terminal.

31. The message structure, as set forth in claim 17, wherein each remote terminal is allocated a number of time slots in the message structure for subscriber traffic, wherein time slots are assigned to subscriber calls dynamically on a per call basis.

32. A central office terminal, comprising:
a first interface operable to receive information from and send information to a plurality of remote terminals over a transport medium, the plurality of remote terminals each providing a communication capability for a plurality of subscribers;
an extraction unit operable to extract and identify information for processing, the first interface operable to send information identified by the extraction unit as being received from a first one of the plurality of remote terminals to a processor in the central office terminal;
a second interface operable to send information identified by the extraction unit as being received from a second one of the plurality of remote terminals for processing by a second central office terminal, the second interface operable to receive information from the second central office terminal, the second interface operable to pass information received from the second central office terminal to the first interface for transfer over the transport medium to the second one of the plurality of remote terminals, wherein the first interface is associated with the first one of the plurality of remote terminals and the second interface is associated with the second one of the plurality of remote terminals.

33. The central office terminal of claim 32, further comprising:
a third interface operable to send information identified by the extraction unit as being received from a third one of the plurality of remote terminals for processing by a third central office terminal, the third interface operable to pass information received by the third central office terminal to the first interface for transfer over the transport medium to the third one of the plurality of remote terminals, wherein the second and third central office terminals have access to the transport medium only through the first interface.

34. The central office terminal of claim 33, wherein the first interface receives information associated with the first, second, and third remote terminals, the extractor unit being operable to extract information associated with the second remote terminal and the third remote terminal to allow the second interface to pass the information associated with the second remote terminal to the second central office terminal and to allow the third interface to pass the information associated with the third remote terminal to the third central office terminal.

35. The central office terminal of claim 32, wherein the transport medium is a wireless communication link.

36. The central office terminal of claim 32, further comprising:
a local exchange interface operable to process information identified by the extraction unit for transfer to a local exchange carrier.

37. The central office terminal of claim 36, wherein the local exchange interface is operable to receive information from the local exchange carrier, the local exchange interface operable to pass on the information received from the local exchange carrier to the first interface for transfer over the transport medium.

38. The central office terminal of claim 37, wherein the local exchange interface is operable to pass on information received from the local exchange carrier to the second interface for transfer to the second central office terminal.

39. The central office terminal of claim 32, wherein the first interface is operable to generate a message structure for transfer over the transport medium, the message structure including concentrated subscriber traffic, control information, and associated signaling allocated in a plurality of time slots.

40. The central office terminal of claim 39, wherein the message structure is partitioned into a desired number of portions corresponding to a number of remote terminals serviced by the transport medium.

41. A central office terminal, comprising:
a first interface operable to receive information from and send information to a transport medium;
an extraction unit operable to extract and identify information for processing;
a second interface operable to send information identified by the extraction unit for processing by a second central office terminal, the second interface operable to receive information from the second central office terminal, the second interface operable to pass information received from the second central office terminal to the first interface for transfer over the transport medium, wherein the first interface is operable to generate a message structure for transfer over the transport medium, the message structure including concentrated subscriber traffic, control information, and associated signaling allocated in a plurality of time slots, wherein each portion of the message structure has a first number of time slots for carrying subscriber traffic of a second number of subscribers associated with the corresponding remote terminal, the first number of time slots being less than the second number of subscribers.

* * * * *